US012661600B2

(12) United States Patent　　　(10) Patent No.:　US 12,661,600 B2
Krauthamer et al.　　　　　　　　　　(45) Date of Patent: 　　Jun. 23, 2026

(54) SYSTEMS AND METHODS FOR PROJECTION MAPPING FOR AN ATTRACTION SYSTEM

(71) Applicant: Universal City Studios LLC, Universal City, CA (US)

(72) Inventors: Akiva Meir Krauthamer, Ocoee, FL (US); Anthony Alexander Mecca, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 854 days.

(21) Appl. No.: 17/830,986

(22) Filed: Jun. 2, 2022

(65) Prior Publication Data

US 2022/0401849 A1　　Dec. 22, 2022

Related U.S. Application Data

(60) Provisional application No. 63/212,423, filed on Jun. 18, 2021.

(51) Int. Cl.
| | |
|---|---|
| *A63J 5/02* | (2006.01) |
| *A63G 31/02* | (2006.01) |
| *G06T 7/70* | (2017.01) |
| *G06T 7/90* | (2017.01) |
| *H04N 9/31* | (2006.01) |

(52) U.S. Cl.
CPC ................. *A63J 5/02* (2013.01); *G06T 7/70* (2017.01); *G06T 7/90* (2017.01); *H04N 9/3182* (2013.01); *A63G 31/02* (2013.01); *G06T 2207/10024* (2013.01)

(58) Field of Classification Search
CPC ..... A63J 5/02; G06T 7/70; G06T 7/90; G06T 2207/10024; H04N 9/3182; H04N 9/3185; H04N 9/3194; A63G 31/02; G09F 19/18; G09F 2019/088
See application file for complete search history.

(56) References Cited

U.S. PATENT DOCUMENTS

| | | | |
|---|---|---|---|
| 8,282,220 | B2 | 10/2012 | Wei et al. |
| 9,055,622 | B2 | 6/2015 | Aldrich et al. |
| 10,089,778 | B2 | 10/2018 | Moule et al. |
| 10,241,616 | B2 | 3/2019 | Lyons et al. |
| 11,196,985 | B1 * | 12/2021 | Elmieh ................. G06Q 50/01 |

(Continued)

OTHER PUBLICATIONS

S. Morishima and T. Yotsukura, "Hypermask: talking head projected onto moving surface," Proceedings 2001 International Conference on Image Processing (Cat. No.01CH37205), Thessaloniki, Greece, 2001, pp. 947-950 vol.3, doi: 10.1109/ICIP.2001.958281. (Year: 2001).*

(Continued)

*Primary Examiner* — Michael D Dennis
(74) *Attorney, Agent, or Firm* — Fletcher Yoder, P.C.

(57) ABSTRACT

An attraction system includes a sensor configured to determine a measured color property of a portion of an image projected by a projector onto a projection surface of the attraction system and a control system communicatively coupled to the sensor. The control system is configured to receive, from the sensor, data indicative of the measured color property and operate the attraction system based on a comparison between the measured color property and a target color property associated with the sensor.

18 Claims, 6 Drawing Sheets

(56) References Cited

U.S. PATENT DOCUMENTS

| | | | | |
|---|---|---|---|---|
| 2005/0030486 A1* | 2/2005 | Lee | ...................... | H04N 9/3185 |
| | | | | 348/E17.005 |
| 2008/0084510 A1* | 4/2008 | Toyooka | .............. | H04N 9/3155 |
| | | | | 348/E9.027 |
| 2010/0007798 A1* | 1/2010 | Togawa | .............. | H04N 9/3182 |
| | | | | 348/E9.037 |
| 2015/0084513 A1 | 3/2015 | Anthony et al. | | |
| 2018/0176521 A1* | 6/2018 | Laduke | ................ | H05B 47/175 |
| 2020/0098190 A1* | 3/2020 | Goergen | .................. | A63G 7/00 |
| 2021/0084264 A1 | 3/2021 | Jeromin | | |
| 2021/0092334 A1 | 3/2021 | Flessas | | |

OTHER PUBLICATIONS

Kurth et al., "Real-Time Adaptive Color Correction in Dynamic Projection Mapping", 2020 IEEE International Symposium On Mixed And Augmented Reality (ISMAR), Nov. 1, 2020, pp. 174-184 (Year: 2020).*

"Axis Auto Alignment Tool", Dec. 3, 2019, 2 pages, Green Hippo, http://www.green-hippo.com/wp-content/uploads/2020/01/AXIS-auto-alignment-tool.pdf.
PCT/US2022/033217 International Search Report and Written Opinion mailed Sep. 30, 2022.
Fujii et al., "A Projector-Camera System with Real-Time Photometric Adaptation for Dynamic Environments", 2017 IEEE Conference On Computer Vision And Pattern Recognition (CVPR), Jan. 1, 2005, p. 814.
Kurth et al., "Real-Time Adaptive Color Correction in Dynamic Projection Mapping", 2020 IEEE International Symposium On Mixed And Augmented Reality (ISMAR), Nov. 1, 2020, pp. 174-184.
Dataton, Mar. 31, 2016, https://cdn.dataton.com/Files-PDF-etc/userguides/WATCHOUT_Users_Guide_6.1.pdf?mtime=20170725121436.
SG Office Action for Singapore Application No. 11202309102U mailed Dec. 23, 2025.
JP Office Action for Japanese Application No. 2023-577976 mailed Feb. 9, 2026.
AE Office Action for United Arab Emirates Application No. P6002967/2023 mailed Mar. 16, 2026.

* cited by examiner

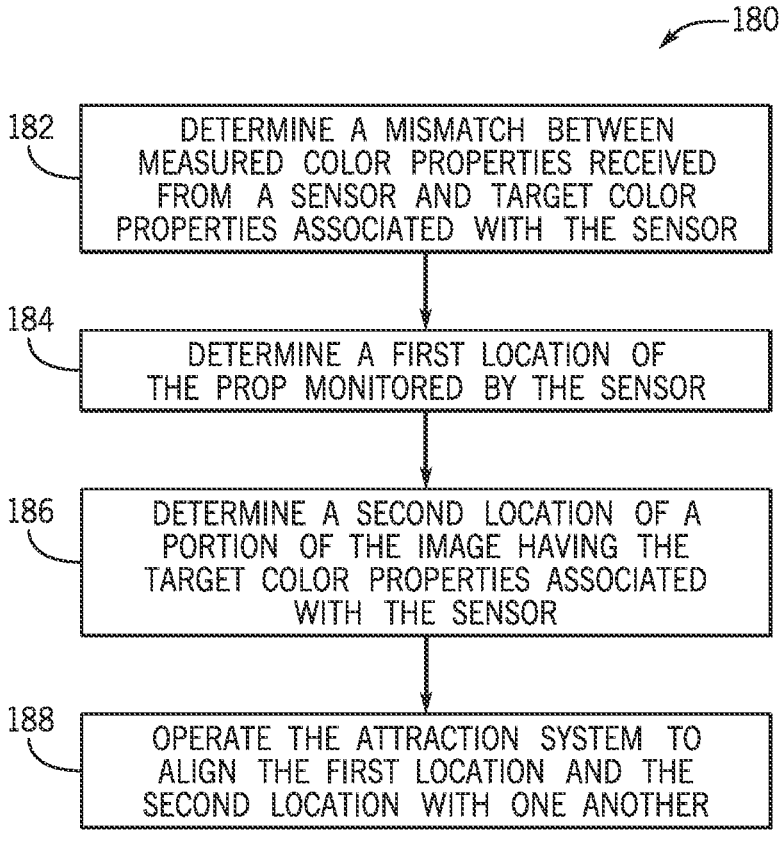

182 — DETERMINE A MISMATCH BETWEEN MEASURED COLOR PROPERTIES RECEIVED FROM A SENSOR AND TARGET COLOR PROPERTIES ASSOCIATED WITH THE SENSOR

184 — DETERMINE A FIRST LOCATION OF THE PROP MONITORED BY THE SENSOR

186 — DETERMINE A SECOND LOCATION OF A PORTION OF THE IMAGE HAVING THE TARGET COLOR PROPERTIES ASSOCIATED WITH THE SENSOR

188 — OPERATE THE ATTRACTION SYSTEM TO ALIGN THE FIRST LOCATION AND THE SECOND LOCATION WITH ONE ANOTHER

FIG. 5

SYSTEMS AND METHODS FOR PROJECTION MAPPING FOR AN ATTRACTION SYSTEM

CROSS-REFERENCE TO RELATED APPLICATION

This application claims priority to and the benefit of U.S. Provisional Application No. 63/212,423, entitled "SYSTEMS AND METHODS FOR PROJECTION MAPPING FOR AN ATTRACTION SYSTEM," filed Jun. 18, 2021, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. In addition, the immersive environment may include audio effects, smoke effects, and/or motion effects. Thus, immersive environments may include a combination of dynamic and static elements. However, implementation and operation of special effects may be complex. For example, it may be difficult to operate certain elements of the special effects in a consistent and desirable manner to create the immersive environment. With the increasing sophistication and complexity of modern ride attractions, and the corresponding increase in expectations among theme or amusement park guests, improved and more creative attractions are desirable, including ride attractions having special effects that are operated to provide the immersive environment.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an attraction system includes a sensor configured to determine a measured color property of a portion of an image projected by a projector onto a projection surface of the attraction system and a control system communicatively coupled to the sensor. The control system is configured to receive, from the sensor, data indicative of the measured color property and operate the attraction system based on a comparison between the measured color property and a target color property associated with the sensor.

In an embodiment, a non-transitory computer-readable medium includes instructions that, when executed by processing circuitry, are configured to cause the processing circuitry to receive sensor data from one or more sensors of an attraction system, the sensor data including measured color properties of an image projected onto a prop of the attraction system by a projector, determine target color properties associated with the image, and operate the attraction system based on a comparison between the measured color properties and the target color properties.

In an embodiment, an attraction system includes a prop, a projector configured to project an image onto the prop, and a control system configured to determine a measured color property of a portion of the image projected onto the prop based on data from a sensor of the prop, determine a target color property of the portion of the image, and adjust operation of the attraction system based on a difference between the measured color property and the target color property exceeding a threshold value.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 5 is a flowchart of an embodiment of a method or process for operating an attraction system to adjust projection mapping onto a prop of the attraction system, in accordance with an aspect of the present disclosure.

DETAILED DESCRIPTION

Figure 1:
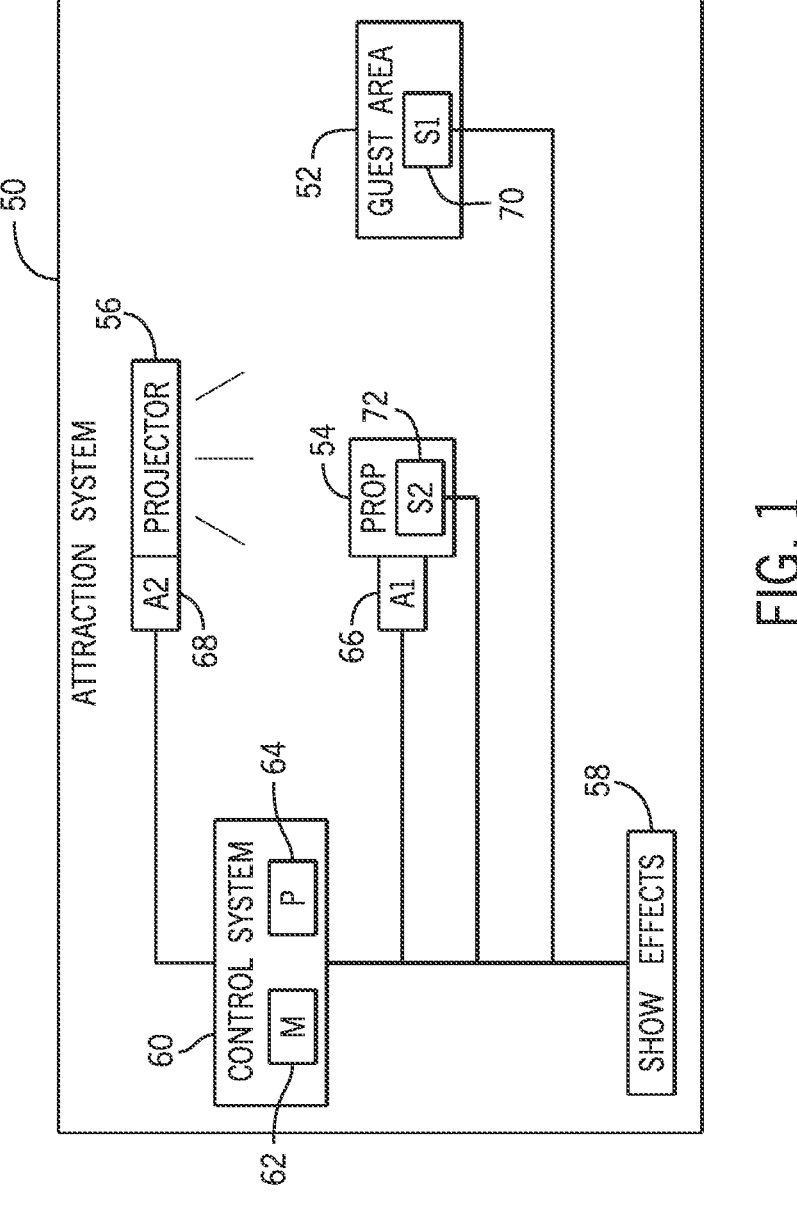
FIG. 1 is a schematic diagram of an embodiment of an attraction system that includes a projector configured to projection map onto a prop, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed to a system of an amusement park. The amusement park may include various attraction systems, such as a ride (e.g., a roller coaster, a water ride, a drop tower), a walkway, and so forth, with features that may entertain guests at the amusement park. For example, an attraction system may include various special effects that may entertain the guests, such as guests that are in a queue and/or a ride vehicle of the attraction system. The special effects may, for instance, include props, such as an animated figure (e.g., a robot). The props may be movable or stationary and may provide an immersive environment for the guests. Additionally, the immersive environment provided by a certain prop may be enhanced via projection mapping by using a projector configured to project an image onto the prop. The image may provide a desirable appearance of the prop, such as by creating a more lifelike appearance of the prop that contextually blends the prop with the environment of the attraction system in a realistic and convincing manner.

In certain embodiments, a prop may be moved within an attraction system, such as via a manually applied force, based on a predetermined program, and/or in response to a user input. Projection mapping onto the prop may be adjusted as the prop moves in order to maintain a desirable appearance of the prop. For instance, a projector may be moved and/or may project a different image in response to movement of the prop. Unfortunately, in some circumstances, the image may not be projected onto the prop as desired after adjustment of the projection mapping. By way of example, over time, the image and the prop may not be aligned with one another due to positional changes and the like. Additionally or alternatively, the projector may be projecting an incorrect image onto the prop. As a result, the appearance of the prop may not be desirable and may affect the immersive environment being provided.

Thus, it is presently recognized that maintaining desirable projection of images onto the prop may improve projection mapping operations and maintain the immersive environment provided to entertain guests. Accordingly, embodiments of the present disclosure are directed to systems and methods for determining detectable color properties of an image that is projected onto a prop and determining whether the color properties match with target or expected color properties indicative that the image is being projected as desired. For example, a sensor (e.g., color sensor) may be disposed on the prop to measure or determine the color properties, such as a hue, an intensity, light wavelength, and/or a lightness, of the image being received at a particular location of the prop. The measured color properties may be compared with the target color properties. In response to a determination that the measured color properties match with the target color properties (e.g., a difference between the measured color properties and the target color properties are within a threshold value), a determination may be made that the image is being projected onto the prop as desired. However, in response to a determination that the measured color properties do not match with the target color properties (e.g., the measured color properties and the target color properties are outside of the threshold value), a determination may be made that the image is not being projected onto the prop as desired. As a result, an additional action may be performed to address the image projection. For example, operation of the attraction system may be adjusted (e.g., to adjust the position of the projector and/or the prop). Thus, the comparison between the measured color properties and the target color properties may improve projection mapping and may therefore improve the experience provided to the guests.

With the preceding in mind, FIG. 1 is a schematic diagram of an embodiment of an attraction system 50 of an amusement park. The attraction system 50 may include a guest area 52 (e.g., a pathway, a seating area, a ride vehicle) where guests may be located. The attraction system 50 may also include a prop 54, which may include any physical object that is used to entertain the guests, such as by providing an immersive environment for the guests with respect to the attraction system 50. For this reason, the prop 54 may be visible to the guests from the guest area 52. In an embodiment, the prop 54 may include an animated figure, which may include electrical and/or mechanical machinery that may cause movement of the prop 54.

The attraction system 50 may also include a projector 56 (e.g., an external projector, an optical projector with lens), which may be hidden or concealed from the guests in the guest area 52 and further enhance the immersive environment. The projector 56 may projection map onto the prop 54. That is, the projector 56 may project an image onto the prop 54, and the image may provide engaging textures that match with a geometry or contour of the prop 54. Indeed, the prop 54 may include a non-flat surface onto which the image may be projected in order to provide a lifelike or realistic appearance of the prop 54. In an embodiment, the projector 56 may adjust the projection mapping onto the prop 54. For example, the projector 56 may be configured to present a different image onto the prop 54 at different times of the operation of the attraction system 50, such as to simulate certain movement of the prop 54.

The attraction system 50 may further include other show effects 58, such as visual effects (e.g., light), audio effects (e.g., sound), smoke effects, and the like, that may further enhance the experience of the guests. The show effects 58 may also be visible to the guests from the guest area 52 in order to entertain the guests. Indeed, the show effects 58, the prop 54, and the projector 56 may collectively create the immersive environment provided to the guests.

To this end, the attraction system 50 may include a control system 60 (e.g., an automation controller, control circuitry) configured to operate the attraction system 50, such as the prop 54, the projector 56, and/or the show effects 58. The control system 60 may include a memory 62 and processing circuitry 64. The memory 62 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50. The processing circuitry 64 may be configured to execute such instructions. For example, the processing circuitry 64 may include one or more application specific integrated circuits (ASICs), one or more field programmable gate arrays (FPGAs), one or more general purpose processors, or any combination thereof.

The control system 60 may, for example, operate the projector 56 to control the projection mapping onto the prop 54. In an embodiment, the control system 60 may transmit image data to the projector 56 for projection onto the prop 54. The image projected onto the prop 54 may provide a realistic appearance of the prop 54. By way of example, the image data transmitted by the control system 60 may accommodate a profile, such as a contour, a geometry, a shape, an outline, a surface area, a volume, and so forth, of the prop 54, such that the image projected based on the image data provides the realistic appearance.

Additionally, in an embodiment, the control system 60 may be configured to move the prop 54 within the attraction system 50. For instance, the control system 60 may rotate and/or translate an entirety of the prop 54, move a portion of the prop 54 (e.g., an arm of the prop 54) relative to a remainder of the prop 54, and so forth. To this end, the attraction system 50 may include a first actuator or actuators 66 communicatively coupled to the control system 60 and configured to move the prop 54. That is, the control system 60 may instruct the first actuator(s) 66 to cause movement of the prop 54, such as based on the operation of the attraction system 50. Similarly, the control system 60 may be configured to move the projector 56 (e.g., based on detected or timed movement of the prop 54) in order to projection map onto the prop 54. Thus, the attraction system 50 may include a second actuator or actuators 68 communicatively coupled to the control system 60 and configured to move the projector 56. The control system 60 may therefore instruct the second actuator(s) 68 to cause movement of the projector 56, such as to rotate and/or translate, in order to adjust projection mapping onto the prop 54 (e.g., to maintain projection of an image onto the prop 54). Thus, the projector 56 may project images onto the prop 54 in synchronization with a current location and/or orientation (e.g., pose) of the prop 54. The second actuator(s) 68 may also be utilized to control image focus and other aspects of the projector 56. Additionally or alternatively, the prop 54 and/or the projector 56 may be manually moved, such as by a guest, an operator, and/or a technician of the attraction system 50, without usage of the control system 60 and/or the actuators 66, 68.

In an example embodiment, the control system 60 may operate the attraction system 50 based on the guests in the guest area 52, thereby creating an interactive experience for the guests. To this end, the attraction system 50 may include a first sensor or sensors 70 disposed in the guest area 52. The first sensor(s) 70 may determine an operating parameter associated with the guests, such as a positioning of the guests, number of guests, features of the guests, heights of the guests, movement (e.g., gestures) of the guests, and the like. Additionally or alternatively, the first sensor(s) 70 may receive an input from one or more guests, such as audio input, haptic input, data transmitted by guest devices (e.g., a phone, a tablet, an arm band), movement or gestural data, and so forth. In a further embodiment, the first sensor(s) 70 may include interactive components, such as a button, a lever, a knob, and so forth, with which the guests may interact. The control system 60 may operate the attraction system 50 based on the operating parameters associated with and/or the inputs provided by the guests, such as by controlling the prop 54 (e.g., causing movement of the prop 54) and/or the projector 56 (e.g., causing movement of the projector 56, adjusting projection mapping by the projector 56).

The attraction system 50 may also include a second sensor or sensors 72 disposed within the prop 54. In an embodiment, the second sensor(s) 72 may be embedded within the prop 54, positioned behind or at a covered part of the prop 54, or otherwise hidden in order to conceal the second sensor(s) 72 from the guests and maintain a realistic appearance of the prop 54 (e.g., to avoid interference with the image projected onto the prop 54). The second sensor(s) 72 may, for instance, be secured to the prop 54 via an adhesive, a fastener, a weld, a punch, or another suitable method to limit undesirable relative movement between the second sensor(s) 72 and the prop 54. The second sensor(s) 72 may be configured to measure or determine color properties of the image being projected onto the prop 54 by the projector 56. For example, the second sensor(s) 72 may measure the color properties by receiving light energy from the projection of the projector 56. The color properties may, for example, include a hue, a brightness, an intensity, a lightness, a tint, a shade, a saturation, a tone, a chroma, another color property, or any combination thereof of the image being received at a portion of the prop 54. The color properties may additionally or alternatively indicate a frequency in which the image or a portion of the image is being adjusted (e.g., changing of the images, flashing or blinking of the images). The second sensor(s) 72 may transmit sensor data to the control system 60 to indicate the measured color properties. The control system 60 may operate the attraction system 50 based on the color properties of the image projected onto the prop 54.

Additionally or alternatively, the control system 60 may operate the attraction system 50 based on operators, technicians, or other workers associated with the attraction system 50. That is, the control system 60 may operate the attraction system 50 based on received operating parameters associated with and/or received inputs provided by the workers. As such, the first sensor(s) 70 may be configured to detect such operating parameters and/or the inputs. For example, the first sensor(s) 70 may be disposed in an area where the workers associated with the attraction system 50 are located.

Figure 2:
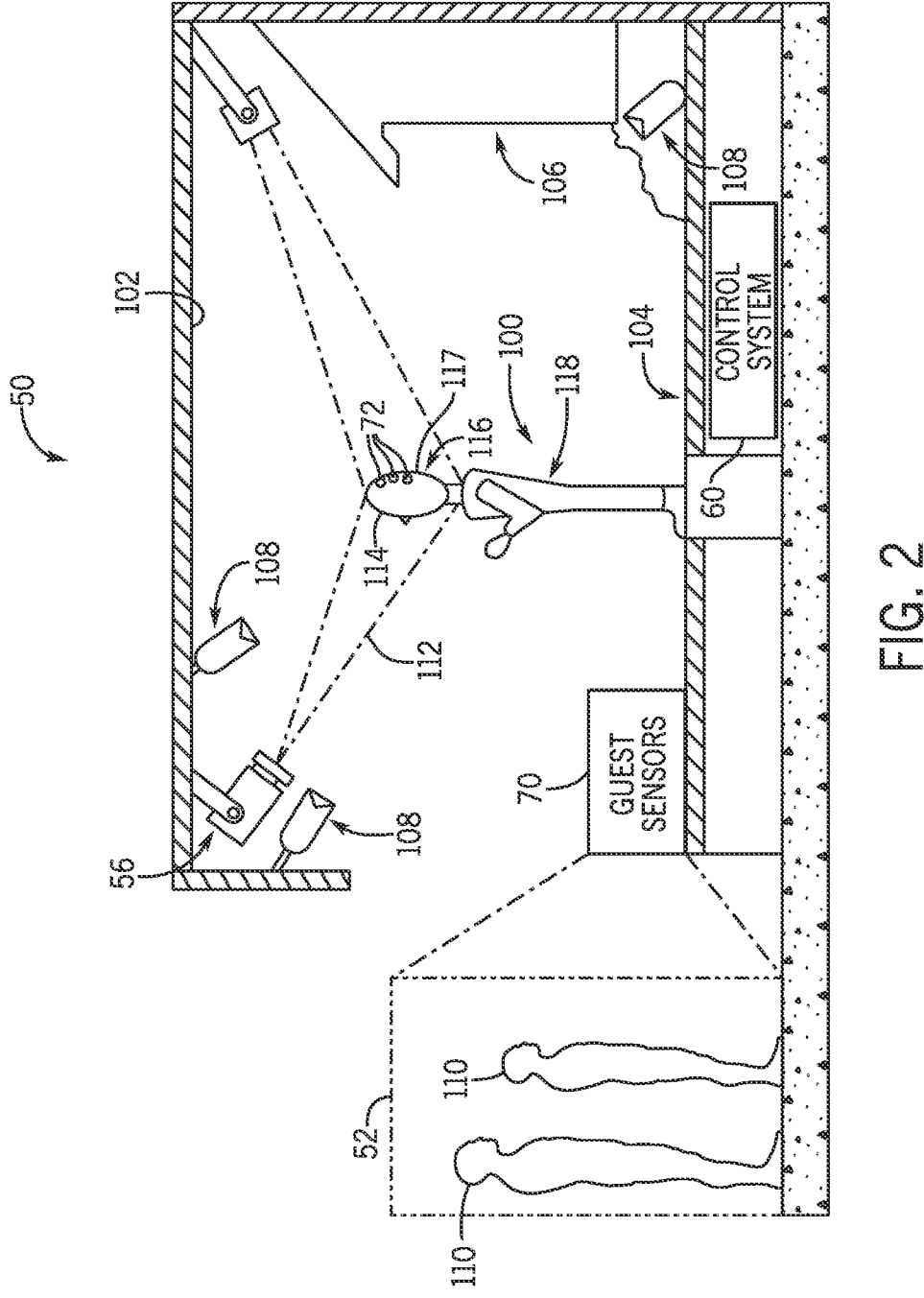
FIG. 2 is a side view of an embodiment of an attraction system that includes a projector configured to projection map onto a prop, in accordance with an aspect of the present disclosure.

FIG. 2 is a side view of the attraction system 50, which includes an animated figure 100. The illustrated attraction system 50 also includes a ceiling 102 and a floor 104. The animated figure 100 and additional scenic objects 106 may be disposed between the ceiling 102 and the floor 104. The attraction system 50 may also include lighting devices 108, which may illuminate the area in which the animated figure 100 and/or the scenic objects 106 are positioned to provide better visibility for guests 110 that are located in the guest area 52. Indeed, the control system 60 may coordinate operation of the animated figure 100, the scenic objects 106, and/or the lighting devices 108 to provide an immersive experience for the guests 110. Although the illustrated attraction system 50 includes a stage-type environment, an additional or alternative attraction system 50 may include any suitable entertainment environment, such as an environment adjacent to a ride path of a ride vehicle carrying the guests 110, an outdoor arena, a queue, and so forth. Furthermore, although the illustrated attraction system 50 includes the first sensor(s) 70 as being configured to monitor the guest area 52 (e.g., interactions of the guests 110), the first sensor(s) 70 of an additional or alternative attraction system 50 may be configured to monitor a different area, such as an area where workers (e.g., an operator) associated with the attraction system 50 are located, an area that includes other props (e.g., the scenic objects 106), and/or any other suitable area associated with the attraction system 50.

The projector 56 may project images 112 onto an external surface 114 (e.g., a projection surface) of a head portion 116 of the animated figure 100. The external surface 114 may, in an embodiment, have a curved profile, and the images 112 projected onto the external surface 114 may accommodate the curved profile in order to provide a more realistic appearance of the animated figure 100. For example, the image data transmitted by the control system 60 to the projector 56 may cause the images 112 to have pixels that, when overlaid onto the external surface 114, form realistic textures about the curved profile. In accordance with the present disclosure, a pixel may refer to a minute area of illumination (e.g., a discrete portion of an image that is projected) that combines with other pixels to form an image. In the illustrated embodiment, the external surface 114 includes a front surface of the head portion 116 of the animated figure 100. In an additional or alternative embodiment, the projector 56 may be configured to project images onto a different part of the animated figure 100, such as onto a different surface (e.g., a back surface 117) of the head portion 116 and/or onto a body portion 118 of the animated figure 100. Furthermore, it should be noted that the attraction system 50 may include any suitable number of projectors 56 and/or animated figures 100. In an example, more than one animated figure 100 may be included within the attraction system 50, and the attraction system 50 may include at least one projector 56 for each animated figure 100. In another example, multiple projectors 56 may be provided to project images onto multiple sides of a single animated figure 100, such as an animated figure 100 that may be visible to the guests 100 from multiple directions and angles.

In an embodiment, the control system 60 may cause the projector 56 to project the images 112 based on an operation of a plurality of possible operations of the attraction system 50. For instance, each operation of the plurality of possible operations may be associated with image data used for projecting images onto the prop 54 (e.g., for projecting different images at different time stamps of the operation of the attraction system 50), and the control system 60 may select and transmit the associated image data based on the determined operation to cause the projector 56 to project the images 112 corresponding to the image data. The control system 60 may, for example, determine the operation of the attraction system 50 based on a detected operating parameter, such as an operating parameter associated with the guests 110 (e.g., as received from the first sensor(s) 70), a ride cycle, a time (e.g., a time of day), an environmental condition (e.g., a temperature, a detected precipitation), or any combination thereof.

The illustrated animated figure 100 includes the second sensor(s) 72 disposed on the head portion 116. The second sensor(s) 72 may be configured to measure or determine the color properties of the images 112 projected onto the animated figure 100 (e.g., onto the external surface 114). During operation of the attraction system 50, the control system 60 may receive sensor data from the second sensor(s) 72 and determine the color properties of the images 112 based on the sensor data. In an embodiment, the images 112 being projected onto the prop 54 may include a collection of pixels, and the second sensor(s) 72 may be configured to determine color properties of a specific set of the pixels corresponding to the location of the second sensor(s) 72.

The control system 60 may also refer to target or expected color properties to be received by the second sensor(s) 72. As an example, the control system 60 may receive operation data that includes the target color properties indicative of the images 112 being projected as desired onto the animated figure 100 (e.g., the images 112 being aligned with the animated figure 100). The control system 60 may compare the measured color properties and the target color properties with one another to determine whether the images 112 are being projected onto the animated figure 100 as desired. As a specific example, a blue color may be intended to be projected onto an eye portion of an animated model of a human face, and a color may be monitored by sensors on the eye portion of the model to confirm that the blue color is being projected onto the appropriate location at the eye portion.

The control system 60 may then operate the attraction system 50 based on the comparison between the measured color properties and the target color properties. In an example, based on a determination that the measured color properties and the target color properties match one another (e.g., the difference between the measured color properties and the target color properties are within a threshold value) to indicate that the images 112 are aligned with the animated figure 100, the control system 60 may continue operation of the attraction system 50 without adjusting alignment between the images 112 and the animated figure 100. In another example, based on a determination that the measured color properties and the target color properties do not match with one another (e.g., the difference between the measured color properties and the target color properties exceed a threshold value) to indicate that the images 112 are misaligned with the animated figure 100, the control system 60 may adjust the position of the prop 54 (e.g., via the first actuator(s)), adjust the position of the projector 56 (e.g., via the second actuator(s)), adjust the images 112 provided by the projector 56, and/or transmit a notification to a user to inform the user that the attraction system 50 is to be adjusted in order to address the mismatch between the measured color properties and the target color properties. Thus, the control system 60 may improve projection mapping operation to improve the experience provided to the guests. Based on data indicating an intended location for projected colors, various data points may be taken and used together to provide guidance on adjustments. For example, certain colors may be expected to be detected relative to each other on a projection surface and when improper colors are detected, adjustments can be made based on known data regarding the relative position of the colors to achieve appropriate correction.

Further, in one embodiment, the control system 60 may modify data to account for external lighting that is not a part of the images 112, such as light projected by the lighting devices 108 and/or ambient light. As an example, the control system 60 may modify the measured color properties to filter or remove the color properties associated with the external lighting. Thus, the measured color properties determined by the control system 60 may more accurately represent the color properties of the images 112 projected by the projector 56 (e.g., without interference by the external lighting). As another example, the control system 60 may modify the target color properties to account for the color properties of the external lighting. In this way, the target color properties may more accurately represent the color properties of the light energy projected onto the animated figure 100 (e.g., a combination of the images 112 and the external lighting). In this way, the measured color properties may be more accurately compared with the target color properties.

Figure 3:
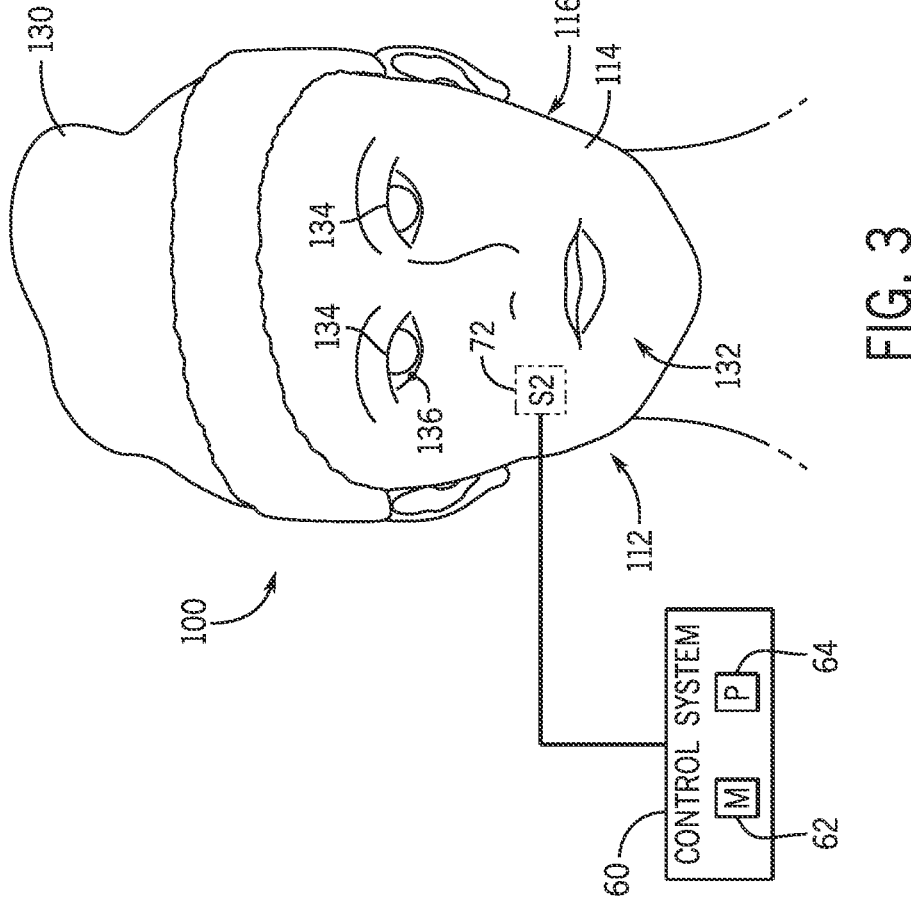
FIG. 3 is a front view of an embodiment of an animated figure configured to receive images provided by a projector, in accordance with an aspect of the present disclosure.

FIG. 3 is a front view of an embodiment of the animated figure 100 with the images 112 projected onto the external surface 114 (e.g., a projection surface) of the head portion 116 of the animated figure 100. The illustrated embodiment of the images 112 includes textures that resemble a face (e.g., a humanoid face). For example, eyebrows, eyes, a nose, lips, and/or wrinkles may be projected onto the head portion 116. Further, the images 112 may include textures that resemble a costume element 130, which is depicted as a hat in the illustrated embodiment. In an additional or alternative embodiment, different features may be projected onto the external surface 114.

During operation of the attraction system, the head portion 116 may be moved (e.g., via a manually applied force, based on instructions transmitted from the control system 60 to the first actuator(s)). For instance, an entirety of the head portion 116 may be moved relative to a remainder of the attraction system and/or different parts of the head portion 116 may be moved relative to one another (e.g., a jaw 132 of the head portion 116 may be opened or closed). In response, the images 112 projected onto the external surface 114 may be adjusted so as to maintain a realistic appearance of the animated figure 100. By way of example, while the head portion 116 is moved, projection of the portions of the images 112 representing eyes 134 may be adjusted to project onto approximately the same location of the external surface 114 to correspond to adjustment of the shape, location, and/or orientation of the head portion 116.

The second sensor(s) 72 may be embedded within the head portion 116 beneath the external surface 114, and the second sensor(s) 72 may determine measured color properties of a portion of the images 112. By way of example, the second sensor(s) 72 may be configured to determine the measured color properties of the portions of the images 112 projected onto a location 136 of the external surface 114 during operation of the attraction system. In an embodiment, the operation data received by the control system 60 may associate each time stamp of the operation of the attraction system with a target color property (e.g., a set of target color properties). Indeed, the target color property may change during operation of the attraction system, such as for dynamic images (e.g., images that depict blinking of the eyes 134). In response to a determination that the measured color properties (e.g., as indicated by the sensor data transmitted by the second sensor(s) 72) associated with the location 136 do not match with the target color properties associated with the location 136, the control system 60 may adjust an operation of the attraction system. For instance, the control system 60 may adjust the operation of the attraction system such that the measured color properties associated with the location 136 matches with the target color properties associated with the location 136.

In an additional or alternative embodiment, each of the images 112 provided by the projector may include a portion having the same target color properties that the second sensor 72 is configured to measure when the images 112 are aligned with the animated figure 100. For example, each of the images 112 may include a pixel having a specific blinking or flashing property, a color value, a particular intensity, and so forth, and the pixel of each of the images 112 may be projected onto the location 136 when the images 112 are aligned with the animated figure 100. In other words, the target color properties configured to be measured by the second sensor 72 may not change substantially throughout operation of the attraction system when the images 112 are aligned with the animated figure 100. In this manner, regardless of the image 112 being projected onto the animated figure 100 at any given time of the operation of the attraction system, the second sensor 72 may be configured to measure the same color properties. Accordingly, in response to a determination that measured color properties determined by the second sensor 72 are different from the target color properties, a misalignment between the images 112 and the animated figure 100 may be determined.

Although the illustrated animated figure 100 includes one of the second sensor(s) 72 configured to determine the measured color properties associated with the location 136, an additional or alternative animated figure 100 may include any suitable number of second sensors 72 (e.g., more than two second sensors 72) configured to determine measured color properties associated with other locations of the external surface 114. The measured color properties determined by each of the second sensors 72 may then be compared with respective target color properties corresponding to the locations associated with the second sensors. Indeed, data detected at various second sensor(s) 72 may be cross-referenced to identify appropriate repositioning. For example, an upper second sensor 72 positioned above a lower second sensor 72 may detect a pixel color that is expected to be detected at the lower second sensor 72, and, in response, the control system 60 may move the animated figure 100 upward and/or may cause the projector to move the images 112 downward to properly align the pixels and second sensors 72 (e.g., such that the pixel color projected onto the animated figure 100 is moved from the upper second sensor 72 toward the lower second sensor 72).

Each of FIGS. 4-6 described below illustrates a respective method or process associated with operation of the attraction system 50 based on color properties of a projected image for projection mapping. In an embodiment, each of the methods may be performed by a single respective component or system, such as by the control system 60 (e.g., the processing circuitry 64). In an additional or alternative embodiment, multiple components or systems may perform the steps for a single one of the methods. It should also be noted that additional steps may be performed with respect to the described methods. Moreover, certain steps of the depicted methods may be removed, modified, and/or performed in a different order. Further still, the steps of any of the respective methods may be performed in parallel with one another, such at the same time and/or in response to one another.

Figure 4:
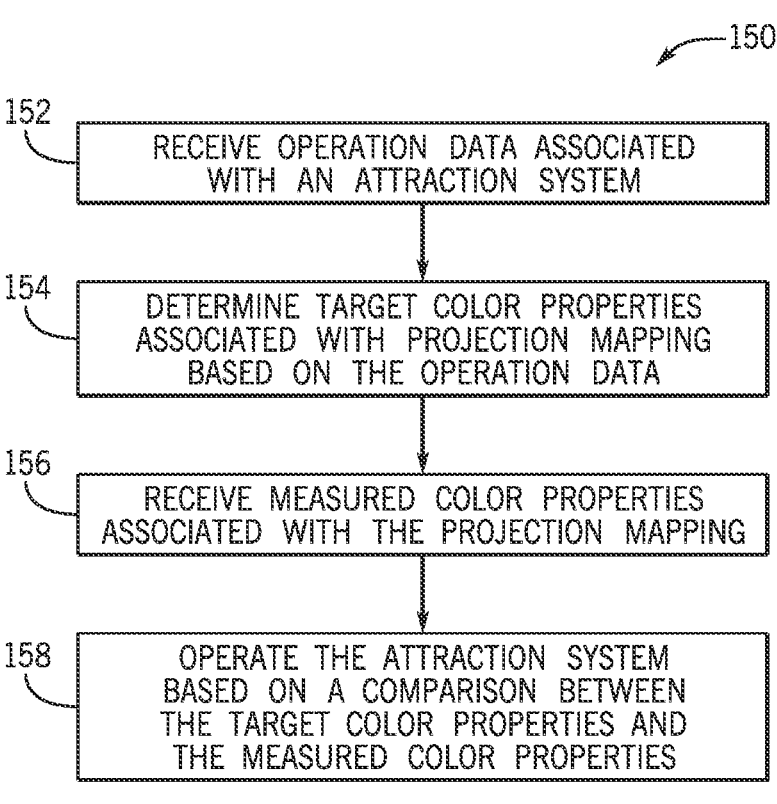
FIG. 4 is a flowchart of an embodiment of a method or process for operating an attraction system based on color properties of an image projected onto a prop of the attraction system, in accordance with an aspect of the present disclosure.

FIG. 4 is a flowchart of an embodiment of a method or process 150 for operating an attraction system based on measured color properties of images projected onto a prop. At block 152, operation data associated with the attraction system may be received. The operation data may define target color properties to be received by a sensor disposed on (e.g., embedded within) the prop. Such target color properties may be associated with images being projected as desired onto the prop, such as to indicate that desired image data is being used to project the image and that the projected image is aligned with the prop as desired. The operation data may, for instance, define respective target color properties for different possible operations of the attraction system. As an example, for each operation of the attraction system, the operation data may associate different time stamps of the operation with a respective set of target color properties.

In one embodiment, the target color properties of the operation data may be defined via a calibration mode. For instance, during the calibration mode, the attraction system may be operated such that the image is projected as desired onto the prop, such as by using position sensors (e.g., a light detection and ranging sensor, an infrared sensor) and/or tracking devices (e.g., a rigid system) to set the alignment of a projector relative to the prop, optical or visual sensors (e.g., a camera, machine vision) to determine the position of the projected image relative to the prop, and/or manual inspection (e.g., visual observation) to determine the appearance of the image projected onto the prop. The prop may be moved (e.g., manually moved, moved via the control system) during the calibration mode, and the image provided by the projector may be adjusted as desired based on movement of the prop. Additionally, during the calibration mode, the sensor disposed on the prop may measure or determine the color properties of the images being projected onto the prop, and such color properties measured during the calibration mode may be set as the target color properties. In this embodiment, the operation data may include a database table that associates the target color properties with different sensors and/or time stamps of the operation of the attraction system, for example.

In an additional or alternative embodiment, the target color properties of the operation data may be automatically generated using software input. By way of example, the operation data may include a three-dimensional (3-D) model or rendering of the prop with coordinates representing different locations of the prop (e.g., positioned in accordance with a geometry the prop). The 3-D model may also define target color properties of the coordinates. The 3-D model may, for instance, generate the color of different coordinates (e.g., for different pixels of a projected image) and the respective color properties of the generated colors. In one embodiment, the 3-D model may use real-time rendering (e.g., a game engine) to generate target color properties of the prop for different positions of the prop, such as positions representing movement of the prop during operation of the attraction system. Indeed, additional images may be projected onto the prop during movement of the prop, and real-time rendering may generate respective target color properties associated with the additional images. Thus, measured color properties subsequently received from the sensor disposed on the prop may be compared with the generated target color properties for the additional images based on the real-time rendering. In this manner, the 3-D model may simulate movement of the prop and generate (e.g., via an algorithm associated with real-time rendering) the target color properties of the prop based on the simulated movement. The usage of the 3-D model may reduce latency associated with determining the target color properties and/ or reduce an amount of resources being used for projection mapping, such as by limiting an amount of storage space for storing information (e.g., a database table) that associates the target color properties of the prop with other parameters.

In a further embodiment, the target color properties of the operation data may be manually defined. That is, the target color properties of different locations of the prop may be set or adjusted based on a user input. For example, the user input may directly define the target color properties, and the user input may set the target color properties independently from a calibration mode of the attraction system and/or a 3-D model of the prop.

At block 154, the target color properties associated with projection mapping may be determined based on the operation data. By way of example, the operation of the attraction system may be determined, and the target color properties associated with the images projected during the operation, as defined by the operation data, may be determined. In one embodiment, the operation of the attraction system may be determined based on sensor data, such as an operating parameter associated with guests (e.g., guest input, guest information), a ride cycle, a time, an environmental condition, and the like. Further, in an embodiment in which the operation data associates target color properties with different time stamps of the operation of the attraction system, a time stamp (e.g., a current time) may be determined, and the target color property associated with the time stamp may be determined based on the operation data.

At block 156, measured color properties associated with projection mapping may be received from the sensor disposed on the prop. That is, the measured color properties of different images being projected onto the prop may be determined by the sensor (e.g., at different time stamps of the operation of the attraction system), and sensor data indicative of the measured color properties may be received from the sensor. Upon receipt of the measured color properties and determination of the target color properties, the measured color properties and the target color properties may be compared with one another. In an embodiment, the measured color properties and/or the target color properties may be modified based on external lighting from other light sources that may interfere with or change the image projected onto the prop. For example, the measured color properties may be modified to remove the color properties of the external lighting (e.g., such that neither the measured color properties nor the target color properties includes the color properties of the external lighting) and/or the target color properties may be modified to factor in the color properties of the external lighting (e.g., such that each of the measured color properties and the target color properties includes the color properties of the external lighting). As such, the measured color properties and the target color properties may be more accurately compared with one another (e.g., without impact from the external lighting color properties).

At block 158, the attraction system may be operated based on the comparison between the target color properties and the measured color properties. By way of example, based on a match between the target color properties and the measured color properties (e.g., a difference between the target color properties and the measured color properties is below a threshold value), operation of the attraction system may continue without further adjusting the measured color properties and the target color properties toward one another. However, based on a mismatch between the target color properties and the measured color properties (e.g., a difference between the target color properties and the measured color properties exceeds a threshold value), the operation of the attraction system may be adjusted to adjust the measured color properties and the target color properties toward one another.

In an embodiment, the projector and/or the prop may be adjusted in order to adjust the measured color properties toward the target color properties. For instance, the projector and/or the prop may be moved and/or a different image data may be transmitted to the projector for projection onto the prop. Such operation may be based on an action or procedure performed to correct a previous mismatch between the target color properties and the measured color properties. By way of example, a technician may manually adjust the attraction system (e.g., by repositioning the prop) to address the previous mismatch, the adjustment performed by the technician may be recorded and stored, and the adjustment may be referred to in response to a subsequent mismatch (e.g., by repositioning the prop accordingly). In one embodiment, corrective action to adjust operation of the attraction system may be performed at a particular time, such as when the image data and/or the prop are not visible to guests (e.g., between ride cycles, when guest presence is not detected). Thus, the impact of the corrective action (e.g., a corrective action that does not successfully address a mismatch between the target color properties and the measure color properties) on guest experiences may be avoided. Several corrective actions, such as incremental repositioning of a prop, may also be performed (e.g., iteratively performed) to address the mismatch without affecting normal operation of the attraction system to entertain guests. Additionally or alternatively, a notification indicative of the mismatch between the target color properties and the measured color properties may be transmitted to a user. Thus, the notification may inform the user to perform an action, such as an inspection, a maintenance, and/or a modification, with respect to the attraction system in order to address the mismatch. The operation of the attraction system performed in response to the mismatch between the target color properties and the measured color properties may improve projection mapping operations.

It should be noted that performance of any of the steps of the method 150 may be repeated during operation of the attraction system. In an example, during a single operation of the attraction system, the steps described with respect to blocks 154, 156, 158 may be performed for each of the sensors disposed on the prop. That is, respective target color properties corresponding to the different sensors may be determined (e.g., based on the operation data), respective measured color properties may be received from each of the sensors, and the attraction system may be operated based on comparisons between the respective target color properties and the respective measured color properties. In another example, the steps described with respect to blocks 154, 156, 158 may be performed at different times during a single operation of the attraction system, such as at various time stamps of the operation. Thus, at each time stamp of the operation, the target color properties may be determined, measured color properties may be received, and the attraction system may be operated based on the comparison between the target color properties and the measured color properties. Indeed, the method 150 may be performed at a particular frequency during the operation of the attraction system, such as based on a frequency in which a new image is being projected onto the prop. In a further example, the step described with respect to block 152 may be performed multiple times. For instance, modified, updated, and/or additional operation data may be received, and the method 150 may be performed based on the newly received operation data.

FIG. 5 is a flowchart of an embodiment of a method or process 180 for operating the attraction system to adjust projection mapping onto the prop, such as during an active operation of the attraction system (e.g., while the prop and/or the projector are in motion). That is, the method 180 may be performed without having to suspend operation of the attraction system, thereby improving continual operation and avoiding downtime of the attraction system. For example, the image may be misaligned with the prop, and the method 180 may be performed to automatically align the image with the prop.

At block 182, a mismatch between measured color properties received from a sensor and target color properties associated with the sensor may be determined, such as via performance of the method 150 described with respect to FIG. 4. As an example, the operation data (e.g., received with respect to block 152 of the method 150) may define target color properties to be received at the sensor when the image is being projected as desired onto the prop, and the target color properties associated with the sensor may therefore be compared with the operation data.

At block 184, in response to determining the mismatch between the measured color properties and the target color properties, a first location of the prop that is monitored by the sensor and associated with the measured color properties may be determined. That is, the sensor may be configured to monitor the measured color properties of the portions of the images being received at the first location of the prop. As an example, a position sensor, such as a light detection and ranging sensor, a camera, an accelerometer, and so forth, may be used to determine the first location (e.g., based on a detected position of the prop on which the sensor is disposed). As another example, stored information (e.g., the operation data) may be referred to for determining the first location.

Furthermore, in response to determining the mismatch between the measured color properties and the target color properties, a second location of a portion (e.g., a pixel) of the projected image may be determined based on the portion of the projected image having the target color properties associated with the sensor, as described at block 186. In an example, an additional sensor disposed on the prop may detect the target color properties, and the location of the prop monitored by the additional sensor may be determined. In another example, the operation data may define the respective color properties of each pixel or other part of the image, as well as the location of each pixel relative to one another. Based on the operation data, a determination may be made that target color properties of a first pixel (e.g., a first pixel having defined color properties that match the target color properties associated with the sensor) are to be detected by the sensor. However, based on the measured color properties, a determination may be made that a second pixel (e.g., a second pixel having defined color properties that match with the measured color properties) is being detected by the sensor instead. The operation data, such as a 3-D model of the prop, may also define a location of the first pixel and the second pixel relative to one another. The location of the first pixel may be determined based on the second pixel being detected by the sensor (e.g., the location of the second pixel aligning with the location of the prop detected by the sensor) and the relative location between the first pixel and the second pixel defined by the operation data. The second location of the portion of the projected image may correspond to the determined location of first pixel.

At block 188, the attraction system may be operated to align the first location and the second location with one another. In other words, the attraction system may be operated such that the measured color properties received from the sensor matches with the target color properties associated with the sensor to indicate that the image and the prop are aligned with one another. In an embodiment, the position of the prop and/or the projector may be adjusted to align the locations with one another. In an additional or alternative embodiment, the images provided by the projector may be adjusted to align the locations with one another.

Figure 6:
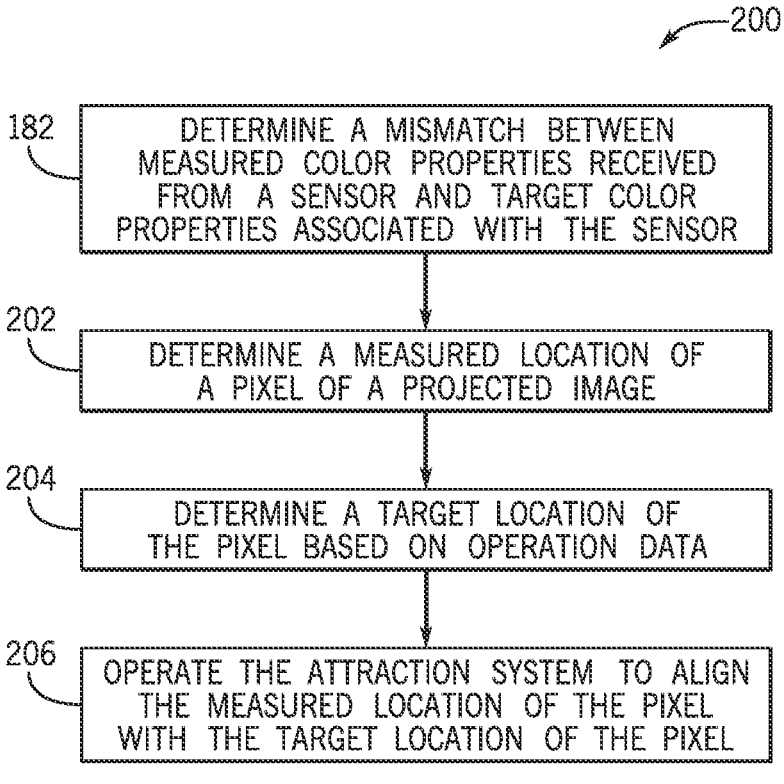
FIG. 6 is a flowchart of an embodiment of a method or process for operating an attraction system to adjust projection mapping onto a prop of the attraction system, in accordance with an aspect of the present disclosure.

FIG. 6 is a flowchart of an embodiment of another method or process 200 for operating the attraction system to adjust projection mapping onto the prop. At block 182, a mismatch between measured color properties received from a sensor and target color properties associated with the sensor may be determined using the techniques described herein. At block 202, in response to determination of the mismatch between the measured color properties and the target color properties, a measured location of a particular pixel or other part of the image projected onto the prop may be determined. For example, the operation data may define the respective color properties of each of the pixels associated with the operation of the attraction system. Measured color properties may be received by the sensor, and a determination may be made that the sensor is detecting the color properties of the particular pixel based on a match between the measured color properties received by the sensor and the defined color properties of the particular pixel. The measured location of the particular pixel may then be determined based on the location of the prop that the sensor is configured to monitor.

At block 204, in response to determination of the mismatch between the measured color properties and the target color properties, a target location of the particular pixel may be determined based on the operation data. For instance, the operation data may also define the respective target locations of each of the pixels during operation of the attraction system, such as target locations on the prop and/or within the attraction system. Thus, the target location of the particular pixel may be determined based on the associated target location defined by the operation data.

At block 206, the attraction system may be operated to align the measured location of the particular pixel and the target location of the particular pixel. Alignment of the measured location with the target location may enable the image to be aligned with the prop. For example, the position of the prop, the position of the projector, and/or the image provided by the projector may be adjusted to align the locations with one another.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
a sensor configured to determine a measured color property of a portion of an image projected by a projector onto a first location on a prop of the attraction system; and
a control system communicatively coupled to the sensor, wherein the control system is configured to:
receive, from the sensor, data indicative of the measured color property;
determine a difference between the measured color property and a target color property exceeds a threshold;
determine a pixel of the image assigned the target color property; and
in response to determining the difference exceeds the threshold, operate the attraction system to align the pixel of the image with the first location on the prop.

2. The attraction system of claim 1, wherein the prop includes a projection surface of the attraction system.

3. The attraction system of claim 2, wherein the control system is configured to:
control movement of the prop; and
operate the projector to project the image onto the prop based on the movement of the prop.

4. The attraction system of claim 3, wherein the control system is configured to determine the target color property of the portion of the image based on the movement of the prop.

5. The attraction system of claim 2, wherein the sensor is embedded beneath an exterior surface of the prop.

6. The attraction system of claim 1, wherein the control system is configured to:
operate the attraction system in a calibration mode;
receive, from the sensor during operation of the attraction system in the calibration mode, initial data indicative of a determined color property; and
determine the target color property based on the determined color property indicated by the initial data received during operation of the attraction system in the calibration mode.

7. The attraction system of claim 1, wherein the control system is configured to output a notification in response to the difference between the measured color property and the target color property exceeding the threshold.

8. The attraction system of claim 1, wherein the control system is configured to:
receive operation data associated with an operation of the attraction system, wherein the operation data associates respective target color properties at a particular location on a projection surface of the prop with time stamps of the operation;
determine a particular time stamp of the operation; and
determine the target color property based on the particular time stamp and the operation data.

9. A non-transitory computer-readable medium, comprising instructions, wherein the instructions, when executed by processing circuitry, are configured to cause the processing circuitry to perform operations comprising:
receiving sensor data from one or more sensors of an attraction system, wherein the sensor data comprises measured color properties of an image projected onto a prop of the attraction system by a projector;
determining target color properties associated with the image;
determining a difference between one of the measured color properties and a corresponding one of the target color properties exceeds a threshold;
determining a first location of the prop based on the one of the measured color properties in response to determining the difference exceeds the threshold;
determining a second location of the image based on a pixel of the second location having the target color properties; and
in response to determining the difference exceeds the threshold, operating the attraction system to shift the image relative to the prop such that the first location of the prop and the second location of the image are aligned.

10. The non-transitory computer-readable medium of claim 9, wherein the instructions, when executed by the processing circuitry, are configured to cause the processing circuitry to perform operations comprising:
determining an operation of the attraction system from a plurality of operations, wherein each operation of the plurality of operations is associated with respective target color properties of the image; and
determining the target color properties associated with the image based on the operation determined from the plurality of operations.

11. The non-transitory computer-readable medium of claim 9, wherein the instructions, when executed by the processing circuitry, are configured to cause the processing circuitry to adjust the image projected by the projector, adjust a position of the projector, adjust a position of the prop, or any combination thereof to align the first location and the second location with one another.

12. The non-transitory computer-readable medium of claim 9, wherein the instructions, when executed by the processing circuitry, are configured to cause the processing circuitry to perform operations comprising:

receiving a three-dimensional (3-D) model representative of the prop, wherein the 3-D model generates respective target color properties of various portions of the prop; and determining the target color properties based on the 3-D model.

13. The non-transitory computer-readable medium of claim 12, wherein the 3-D model comprises real-time rendering associated with movement of the prop, and the instructions, when executed by the processing circuitry, are configured to cause the processing circuitry to perform operations comprising:

determining additional target color properties associated with an additional image projected onto the prop by the projector based on the real-time rendering;

receiving additional sensor data from the one or more sensors, wherein the additional sensor data comprises additional measured color properties of the additional image; and operating the attraction system based on a comparison between the additional measured color properties and the additional target color properties.

14. The non-transitory computer-readable medium of claim 9, wherein the instructions, when executed by the processing circuitry, are configured to cause the processing circuitry to perform operations comprising:

modifying the measured color properties, the target color properties, or both, based on external lighting projected onto the prop; and comparing the measured color properties and the target color properties with one another after modifying the measured color properties, the target color properties, or both.

15. An attraction system, comprising:

a prop;

a projector configured to project an image onto the prop; and a control system configured to:

determine a measured color property of a portion of the image projected onto a first location on the prop based on data from a sensor of the prop;

determine a target color property of the portion of the image;

determine a difference between the measured color property and the target color property exceeds a threshold;

determine a pixel of the image assigned the target color property; and in response to determining the difference exceeds the threshold, adjust operation of the attraction system to align the pixel of the image with the first location on the prop.

16. The attraction system of claim 15, wherein the control system is configured to:

identify an additional pixel of the image based on the additional pixel having the measured color property;

determine a measured location of the additional pixel;

determine a target location of the additional pixel; and adjust the operation of the attraction system to align the measured location and the target location with one another.

17. The attraction system of claim 16, wherein the control system is configured to:

determine a location being monitored by the sensor; and determine the measured location of the additional pixel based on the location monitored by the sensor.

18. The attraction system of claim 15, wherein the measured color property and the target color property comprise a hue, a brightness, an intensity, a lightness, a tint, a shade, a saturation, a tone, a chroma, or any combination thereof.

* * * * *